United States Patent [19]
McClure

[11] Patent Number: 5,357,236
[45] Date of Patent: Oct. 18, 1994

[54] PARALLELIZED DIFFERENCE FLAG LOGIC

[75] Inventor: David C. McClure, Carrollton, Tex.

[73] Assignee: SGS-Thomson Microelectronics, Inc., Carrollton, Tex.

[21] Appl. No.: 890,919

[22] Filed: May 29, 1992

[51] Int. Cl.$^5$ .............................................. G06F 7/02
[52] U.S. Cl. ................................ 340/146.2; 307/355
[58] Field of Search ....................... 307/355; 340/146.2

[56] References Cited

U.S. PATENT DOCUMENTS

| | | | |
|---|---|---|---|
| 4,728,927 | 3/1988 | Aman | 340/146.2 |
| 4,935,719 | 6/1990 | McClure | 340/146.2 |
| 5,027,330 | 6/1991 | Miller | 365/239 |
| 5,060,143 | 10/1991 | Lee | 340/146.2 |
| 5,084,841 | 1/1992 | Williams et al. | 365/189.07 |
| 5,165,046 | 11/1992 | Hesson | 307/491 |

FOREIGN PATENT DOCUMENTS 1603654 5/1971 France .

OTHER PUBLICATIONS

Electronic Engineering vol. 62, No. 760, pp. 27–28 Apr. 1990, London GB.

Primary Examiner—Margaret Rose Wambach
Attorney, Agent, or Firm—Renee M. Larson; Lisa K. Jorgenson; Richard K. Robinson

[57] ABSTRACT

Difference flag logic suitable for use in a FIFO memory is modified to quickly generate FIFO flag status without the use of subtractor circuitry. Bit comparators, which determine if a first bit is less than, equal to, or greater than a second bit, of a magnitude comparator are divided into groups which generate compare output signals in parallel to one another, thereby reducing total magnitude comparator delay and resulting in faster operation. These compare output signals are the inputs of a control element which determines which compare output signal is allowed to pass through as the final compare output signal. The subtractor function is replaced by offsetting the read count from the write count by a value equal to the desired FIFO flag value. In addition, control of selected bits, such as the most significant bits (MSBs), of the numbers is included and may be used as necessary to avoid a wrap-around condition.

35 Claims, 4 Drawing Sheets

PARALLELIZED DIFFERENCE FLAG LOGIC

CROSS REFERENCE TO RELATED APPLICATIONS

The subject matter of the present application is related to copending U.S. application Ser. No. 07/876,959 titled "Parallelized Magnitude Comparator Circuitry for Comparing Two Binary Numbers", Attorney Docket No. 91-C-146, filed on Apr. 30, 1992, and copending U.S. application Ser. No. 08/876,851 "Parallelized Magnitude Comparator For Comparing A Binary Number to a Fixed Value", Attorney Docket No. 91-C-147, filed on Apr. 30, 1992, both assigned to the assignee hereof, and both of which are herein incorporated by reference.

BACKGROUND OF THE INVENTION

1. Field of the Invention

The present invention relates generally to integrated circuits, and more specifically to a difference flag circuit for use in FIFO memories.

2. Description of the Prior Art

First In First Out (FIFO) memories are used in a variety of applications as an interface between two or more devices which transmit data at different rates of speed. Typical interface applications for FIFOs include placement between a computer and a printer or between a computer and a high speed modem. Because of the speed difference between devices, data stored inside a FIFO may be read out of the FIFO at a different rate than it was written into the FIFO. Since FIFOs are capable of receiving data at a rate different than the rate at which data is read, it is important to quantify the amount of data in the FIFO. Therefore, a FIFO has one or more flags which indicate the data status of the FIFO. Typical FIFO flags indicate full, empty, and half-full data status.

FIFO flag circuitry has historically included comparators and subtractors. The subtractor determines the difference between two values being compared. That difference is then presented as an input to a corresponding comparator. The comparator determines the relationship between two values and whether they are equal or unequal to each other. The appropriate comparator output signal is then generated. The FIFO flag signal is not determined until the subtractors and the comparators have completed their tasks. U.S. Pat. Nos. 4,974,241, issued Nov. 27, 1990 and 4,935,719 issued Jun. 19, 1990 both in the name of inventor David C. McClure, discuss use of serial subtractors and serial comparators to generate FIFO flag logic in the prior art. Traditionally, subtractor circuitry has been slower than comparator circuitry, and so generation of the FIFO flag was impeded as the comparator circuitry waited on the subtractor circuitry. This wait can be quite long in the prior art where serial subtractors and comparators dictated long signal propagation delays. By eliminating the need for subtractors in FIFO flag logic circuitry, the FIFO flag signal may be more quickly generated. U.S. Pat. No. 4,891,788 by inventor Gerard A. Kreifels which issued Jan. 2, 1990 gives insight on prior art techniques for generating FIFO flag logic without the use of a subtractor.

In the prior art, serial magnitude comparators are a common form of comparator circuits. They have a number of individual bit comparators that together serially determine the magnitude of a number relative to another number. First, the least significant bits (LSBs) of the two numbers are compared before comparing the next bits, the LSB+1. This process continues serially until the most significant bits (MSBs) are compared. The serial process can be quite time consuming; at least 16 gate delays will be incurred for comparing two 16 bit words.

The individual bit comparators which comprise a serial magnitude comparator have four inputs: two inputs derived from the two bits to be compared, an input from the compare output of the previous bit comparator, and an input equal to one of the two bits being compared. The compare output of a bit comparator is input to the subsequent bit comparator and reflects whether the magnitude of one bit is equal to, less than, or greater than the magnitude of the second bit. If the two bits being compared are equal, then the compare input is passed through the bit comparator as the compare output. If, however, the two bits are unequal in magnitude, then the input equal to the first bit of the two bits being compared is passed through as the compare output. This comparison process starts with the least significant bit (LSB) comparator and continues until the most significant bit (MSB) comparator finishes its comparison operation. The bit comparator with the highest order bit of difference determines the state of the final compare output.

The gate delays associated with serial magnitude comparators and subtractors can have an adverse effect on generating a FIFO flag signal in a timely manner. Prior art FIFO flag logic, which is dependent on the comparator and subtractor, must be generated quickly. If the magnitude comparator is slow, it will have an adverse affect on how quickly flag logic may be generated and overall FIFO performance will suffer. A fundamental way to enhance the speed at which FIFO flag logic is generated is to minimize propagation and gate delays associated with serial magnitude comparators. It would be desirable to accomplish this using current magnitude comparator design. The speed at which FIFO flag logic is generated may be further enhanced by eliminating the need for subtractor circuitry altogether.

SUMMARY OF THE INVENTION

Difference flag logic suitable for use in a FIFO memory is modified to quickly generate FIFO flag status without the use of subtractor circuitry. Bit comparators, which determine if a first bit is less than, equal to, or greater than a second bit, of a magnitude comparator are divided into groups which generate compare output signals in parallel to one another, thereby reducing total magnitude comparator delay and resulting in faster operation. These compare output signals are the inputs of a control element which determines which compare output signal is allowed to pass through as the final compare output signal. The subtractor function is replaced by offsetting the read count from the write count by a value equal to the desired FIFO flag value. In addition, control of selected bits, such as the most significant bits (MSBs), of the numbers is included and may be used as necessary to avoid a wrap-around condition.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

A FIFO is a First In First Out memory typically used in applications between machines which transmit and receive data at different rates of speed: for instance, between a computer and a printer. Writing data into the FIFO at a different rate of speed than reading data out of the FIFO makes it necessary to know how much data is actually in the FIFO at any particular point in time. The FIFO memory outputs its data status through the use of a FIFO flag. Comparators are frequently used in conjunction with subtractors in FIFO memory circuits to generate FIFO flags. Subtractors are commonly slower than comparators, so it is desirable to have FIFO flag circuitry which does not utilize subtractors. Also, eliminating subtractor circuitry reduces required layout area and associated circuitry.

The FIFO flag output indicates the data status of the FIFO and so may indicate that the FIFO is full, half full, and empty, for instance. In order to determine FIFO data status, it is necessary to track how many bits have been written in and how many bits have been read out of the FIFO. Also, it is necessary to know the relationship between the magnitude of two numbers, such as a write count and a read count, and whether the magnitude of one number is equal to, less than, or greater than the magnitude of the second number. Comparing the magnitude of these numbers is accomplished through the use of a magnitude comparator circuit inside the FIFO.

Figure 1:
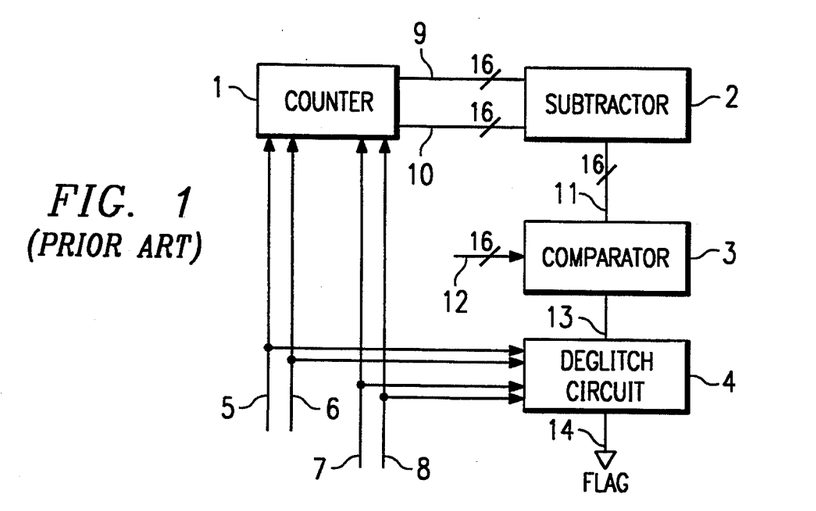
FIG. 1 is a block diagram of a FIFO flag generation circuit according to the prior art.

Referring to FIG. 1, a block diagram of a FIFO Flag generation circuit according to the prior art is shown. The FIFO Flag has a counter block 1, a subtractor block 2, a comparator block 3, and a deglitch block 4. The write clock 5, the read clock 6, the write reset clock 7, and the read reset clock 8 are input signals to both the counter block 1 and the deglitch block 4. The counter block 1 takes these input signals and generates a write count 9 and a read count 10 which are input to the subtractor block 2 which in turn outputs a difference signal 11. This difference signal 11 and a program value 12 are input to the comparator block 3 which compares them in order to generate an output compare signal 13. As is well known in the art, the program value 12 is set to different values depending on the type of flag signal 14, such as empty, half full, or full, to be generated. Finally, the compare signal 13 as well as the write clock 5, the read clock 6, the write reset clock 7, and the read reset clock 8 are input to the deglitch block 4 which generates a flag output signal 14.

Figure 2:
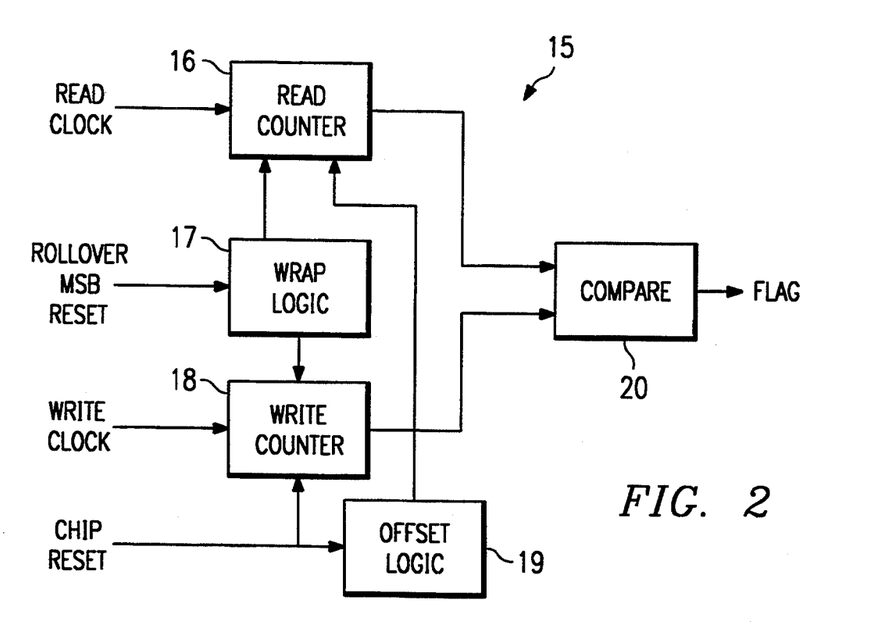
FIG. 2 is a block diagram of a FIFO flag generation circuit according to the present invention.

Referring to FIG. 2, a block diagram 15 of a FIFO flag generation circuit according to the present invention is shown. A read closk signal and a white clock signal are provided as inputs to the read counter 16 and the write counter 18, rspectively. Compare block 20 uses the output signals of the read counter 16 and the write counter 18 to generate an ouput Flag signal. During a chip reset, the write counter 18 is reset to all zeros, and read counter 16 is reset to the required flag value as determined by offset logic 19. The offset is normally determined by forcing the write and read counters to some predetermined value upon chip reset. The offset of the read counter from the write counter allows a FIFO flag signal to be generated without the use of subtractor circuitry as is the case in the prior art. Rollover MSB Reset is a signal determined by performing login on the Most Significant Bit (MSB) of the read and write counters. When the MSBs of both the read and write counters are equal to 1, wrap login 17 resets the read and write counter MSBs to 0. The Rollover MSB Reset signal prevents a wrap-around problem from occurring and will be discussed in more detail later.

Figure 3:
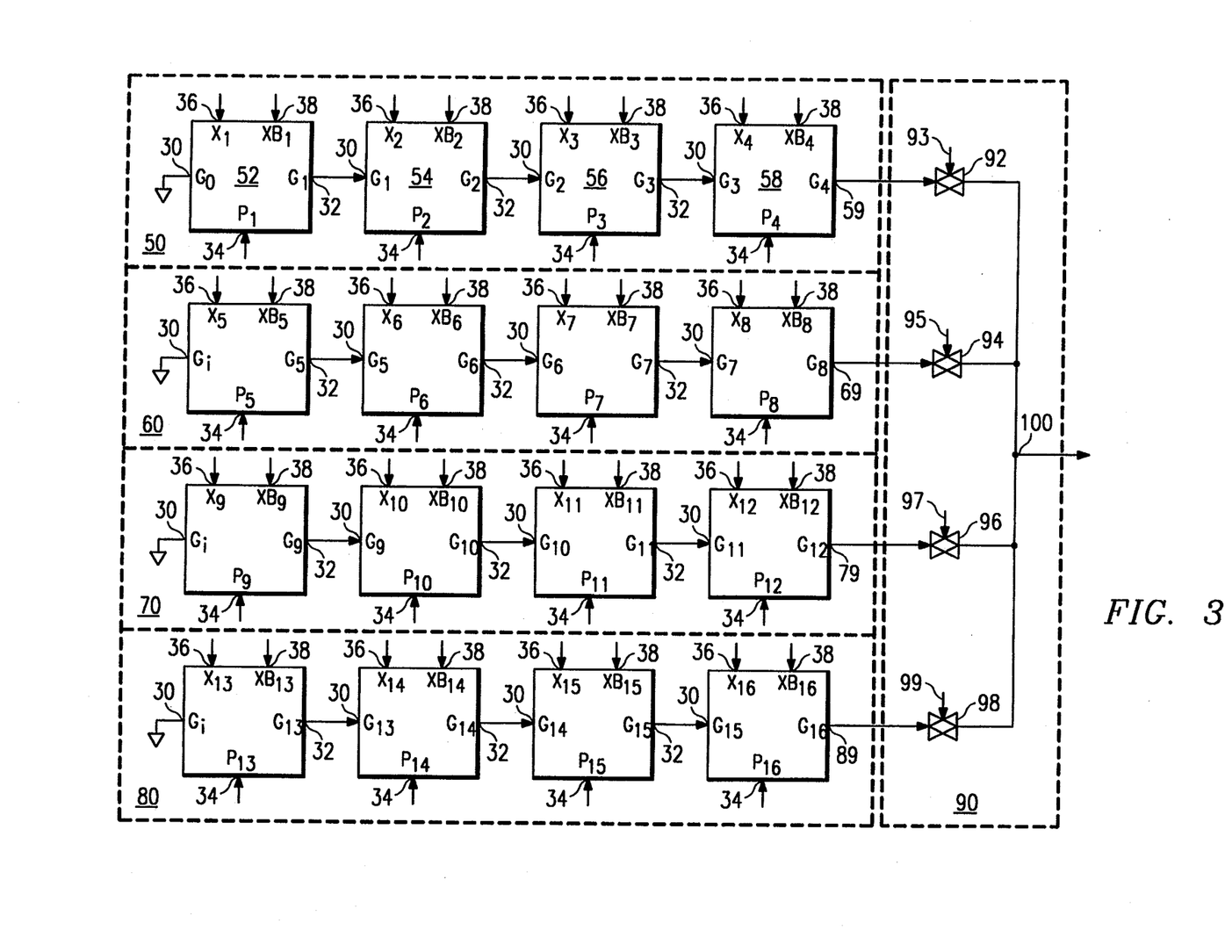
FIG. 3 is a schematic diagram of a parallel magnitude comparator according to the present invention.

The compare block 20 of FIG. 2 is shown in more detail in the parallel magnitude comparator circuitry of FIG. 3, according to the present invention. The parallel magnitude comparator of FIG. 3, therefore, is electrically connected to the blocks of the FIFO flag generation circuit of FIG. 2 in the same manner as compare block 20 and performs the compare function of compare block 20 according to the present invention.

FIG. 3 shows a schematic diagram of a parallel magnitude comparator according to the present invention which is responsible for determining the relationship between the magnitude of two numbers. The parallel magnitude comparator is comprised of bit comparators which are segmented into groups which operate independently of each other in parallel. The number of bit comparators needed is a function of the number of bits in the two numbers being compared. Referring to FIG. 3, the bit comparators are divided into comparator groups 50, 60, 70, and 80.

Figure 3A:
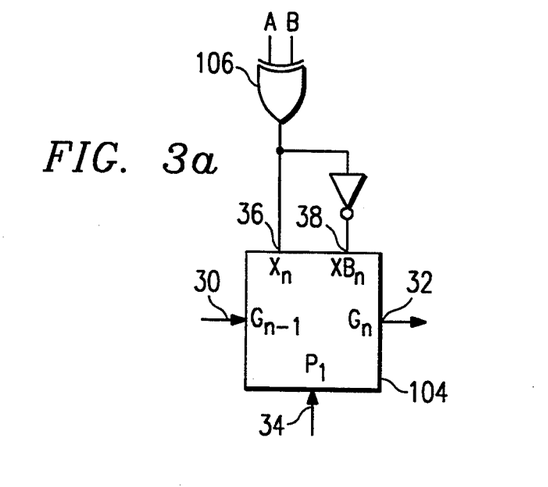
FIG. 3a is Exclusive OR circuitry used to perform logic on two bits to be compared, according to the present invention.

Every bit comparator has four inputs. The two bits to be compared are input to an exclusive OR gate, the output of which is input 36. FIG. 3a shows Exclusive OR circuitry 102 which is used to perform logic on the two bits to be compared, according to the present invention. The two bits to be compared, A and B, are input to exclusive OR gate 106, the output of which is input 36 to bit comparator 104. Bit comparator 104 is analogous to bit comparators 52, 54, 56 and 58 of FIG. 3 and has input 36, the result of exclusive ORing bits A and B, input 38, the inverse of input 36, compare input 30, input 34, and compare output 32. Input 38, which is simply the inverse of input 36, could easily be generated internal to the bit comparator, in which case it would not be an input signal. The other two inputs to the bit comparators are the output of the previous bit comparator 30, and input 34, the first bit of the two bits being compared. Input 34 is different from program value 12 shown in FIG. 1. FIG. 3 and FIG. 3a show two changing binary numbers being compared whereas FIG. 1 shows a binary number being compared with a fixed value represented by program value 32.

Bits A and B are input signals of exclusive OR gate 106 of FIG. 3a. Therefore, if bit A and bit B have the same magnitude, then input 36 will be equal to 0 and input 38, the inverse of input 36, will be equal to 1. When input 36 is equal to 0, bit comparator 106 passes through compare input 30 as compare output 32. Thus, when bits A and B are equal in magnitude, compare input 30 is passed through the bit comparator as compare output 32. However, if bit A and bit B have different magnitudes, then input 36 will be equal to 1 and input 38 will be equal to 0. When input 36 is equal to 1, bit comparator 106 will pass through input 34 as compare output 32. Thus, when bits A and B are not equal in magnitude, input 34 is passed through the bit comparator as compare output 32. The truth table of Table 1 below shows the relationship between the bit A, bit B, input 36, and output 32.

TABLE 1

| Bit A | Bit B | Input 36 | Output 32 |
|---|---|---|---|
| 0 | 0 | 0 | Input 30 |
| 0 | 1 | 1 | Input 34 |
| 1 | 0 | 1 | Input 34 |
| 1 | 1 | 0 | Input 30 |

As an example, if each of the four bit comparators 52, 54, 56, and 58 of comparator group 50 of FIG. 3 compares bits that are equal to each other, then the logic low compare input 30 of initial bit comparator 52 will be passed through subsequent bit comparators 54, 56, and 58 until compare output 59 of the comparator group 50 is generated. At this point, the logic low compare output signal 59 will be an input signal to control element 90. At all times, as in this example, output compare 59 of the comparator group 50 is equal to compare output 32 of the bit comparator having the highest order difference.

In a sixteen bit example, comparator group 50 compares the magnitude of the four least significant bits (LSBs) of two numbers. Comparator groups 60 and 70 compare the magnitude of bits 5–8 and 9–12, respectively, while comparator group 80 compares the magnitude of the most significant bits (MSBs), 13–16. Comparison of these bits occurs serially within the comparator groups, with comparator groups 50, 60, 70, and 80 operating in a parallel fashion to one another. Therefore, comparison of all sixteen bits occurs in the same amount of time required to compare four bits in the prior art serial magnitude comparator. Clearly this means an increase in performance for any system using a parallel magnitude comparator. One skilled in the magnitude comparator art will recognize that breaking the bit comparators into groups of four is only one of many ways to group the bit comparators.

The compare output signals 59, 69, 79, and 89 of each comparator group are inputs to the control element 90. Only one of these compare output signals, selected by control element 90, will be passed through the control element to be final compare output 100. Control element 90 has a plurality of transmission gates 92, 94, 96, and 98 each of which corresponds to one comparator group: 50, 60, 70, and 80, respectively. Each transmission gate has as inputs the compare output from the corresponding comparator group and an logic input determined by boolean equations. Transmission gate 92 has as its inputs compare output 59 of comparator group 50 and logic input 93. The logic inputs 93, 95, 97, and 99 ensure that only the compare output of the comparator group having the highest order bits with magnitude difference will be passed out of control element 90 as final compare output 100. If none of the bits are different, then compare output 59 of the lowest order comparator group 50 is passed through control element 90 as final compare output 100.

Logic inputs 93, 95, 97, and 99 are determined by the following equation: $S_N = X_N + X_{N-1} + X_{n-2} + X_{N-3}$, where $X_N$ is the result of exclusive ORing the two bits to be compared. Specifically, the logic inputs are as follows:

Input $99 = S_{16} + X_{16} + X_{15} + X_{14} + X_{13}$

Figure 3B:
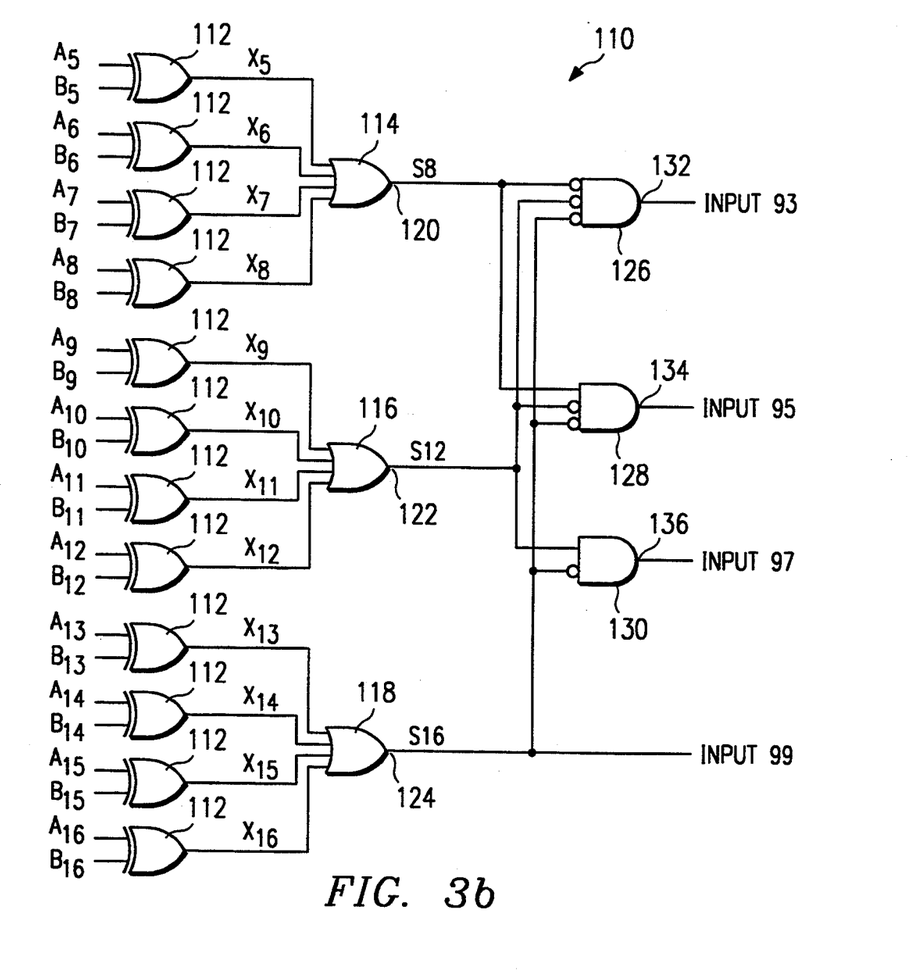
FIG. 3b is logic circuitry used to generate logic signals, according to the present invention.

Input $97 = S_{12} * \overline{S_{16}} = (X_{12} + X_{11} + X_{10} + X_9) * \overline{S_{16}}$ Input $95 = S_8 * \overline{S_{12}} * \overline{S_{16}} = (X_6 + X_7 + X_6 + X_5) * \overline{S_{12}} * \overline{S_{16}}$ Input $93 = \overline{S_8} * \overline{S_{12}} * \overline{S_{16}}$ FIG. 3b shows logic circuitry 110 used to generate logic inputs 93, 95, 97, and 99, according to the present invention. Logic circuitry 110 tracks the equations shown above for determining logic inputs 93, 95, 97, and 99. One skilled in the art will recognize that there are myriad ways to produce logic inputs 93, 95, 97, and 99 in addition to logic circuitry 110 of FIG. 3b. Two corresponding bits An Bn of the two numbers to be compared are input signals to an exclusive OR gate 112. In the sixteen bit example of FIG. 3, bit A5 and bit B5 are input signals to an exclusive OR gate 112 whose output X5 is one of four input signals to OR gate 114. Bits A6 through A8 and bits B6 through B8 are likewise input to exclusive OR gates 112, as shown, to generate the three remaining input signals X6, X7, and X8 of OR gate 114. In a similar fashion, Bits A9 through A12 and B9 through B12 are input to exclusive OR gates 112 as shown to generate input signals X9, X10, X11, and X12 of OR gate 116. Also, bits A13 through A16 and B13 through B16 are input to exclusive OR gates 112 to generate input signals X13, X14, X15, and X16 of OR gate 118.

The result of introducing signals X5, X6, X7, and X8 to OR gate 114 is S8 signal 120. Likewise, OR gate 116 generates S12 signal 122 when given input signals X9, X10, X11, and X12; OR gate 118 generates S16 signal 124 when given input signals X13, X14, X15, and X16. AND gate 126 has as input signals the inverse of signals 120, 122, and 124 and produces Input 93 as its output. AND gate 128 has as input signals S8 signal 120, the inverse of S12 signal 122, and the inverse of S16 signal 124 and produces Input 95 as its output. AND gate 130 has as input signals S8 signal 120 and the inverse of S16 signal 124, and produces Input 97 as its output. Finally, Input 99 is equal to S16 signal 124. Input 93, Input 95, Input 97, and Input 99 correspond to logic inputs 93, 95, 97, and 99, respectively, of FIG. 3. When one of the logic inputs 93, 95, 97, or 99 is high, its corresponding transmission gate turns on and allows the corresponding comparator group compare output, 59, 69, 79, or 89, to pass through the transmission gate. If, however, the logic input is low, its corresponding transmission gate turns off and does not allow the corresponding compare output signal to pass through the transmission gate. These equations guarantee that the compare output of the comparator group having the highest order of bit difference is passed out as final compare output 100. For instance, if two binary numbers have unequal magnitudes for bit 14 and also for bit 2, the logic inputs ensure that compare output 89 of comparator group 80 will be passed out as final compare output 100 since bit 14 is more significant than bit 2. Determination of logic inputs 93, 95, 97, and 99 occurs at the same time comparator groups 50, 60, 70, and 80 perform magnitude compare operations. This parallel operation allows the appropriate compare output 59, 69, 79, or 89 to be selected by control element 90 and passed out as final compare output 100 immediately after the comparator groups have completed comparison operations. Control element 90 adds no delay to the parallel magnitude comparator comparison time, since control element 90 finishes its operations prior to or at the same time group compare outputs 59, 69, 79, and 89 are ready to be passed through the control element 90.

The present invention as described in FIG. 3, would result in five gate delays: one gate delay for each magnitude comparator operating serially in a comparator group, such as bit comparators 52, 54, 56, and 58 in comparator group 50, and one gate delay for control element 90. The invention requires no buffering since the bit comparators are split into groups of four. This is a marked improvement over the prior art serial magnitude comparator which results in at least 16 gate delays, one for each bit comparator. In the 16 bit example, buffering is needed to avoid the signal degradation which would occur from propagating through 16 serially connected bit comparators. The gate delay is even greater when buffering is used in the serial magnitude comparator. If an invertor were placed after every fourth bit comparator, four extra gate delays would be added for a total of 20 gate delays.

Figure 4:
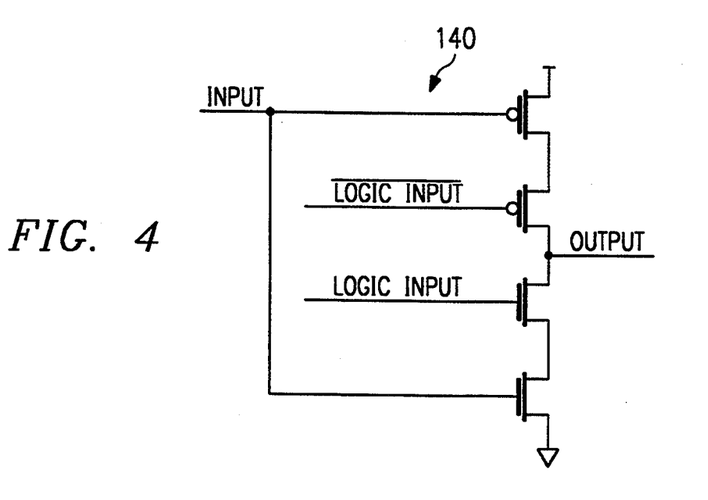
FIG. 4 is a schematic diagram of a tri-stateable gate according to the present invention.

An alternative embodiment of the invention using a tri-stateable gate rather than a transmission gate is shown in FIG. 4. FIG. 4 shows a tri-stateable gate 140 with three inputs: INPUT, LOGIC INPUT and LOGIC INPUT. INPUT is the compare output signal from the corresponding comparator group and is analogous to group compare outputs 59, 69, 79, and 89 shown in FIG. 3. LOGIC INPUT is analogous to logic Inputs 93, 95, 97, and 99 of FIG. 3; LOGIC INPUT is determined by the same $S_N$ equations shown above. LOGIC INPUT is simply the inverse of LOGIC INPUT. The OUTPUT signal is determined by the state of the LOGIC INPUT signal. When LOGIC INPUT is a logic high; LOGIC INPUT is a logic low, and the LOGIC INPUT signal is passed through as the OUTPUT. When LOGIC INPUT is a logic low, LOGIC INPUT is a logic high, and tri-stateable gate 110 is effectively in a high impedance state and shuts off, allowing nothing to pass.

Four tri-stateable gates 140 would take the place of the four transmission gates shown in FIG. 3 and would both multiplex and buffer in the same stage. The outputs of these four pass gates would be wired together for a single final compare output 100. In this case, buffering would still not be required for the 16 bit parallel magnitude comparator shown in FIG. 3.

In the preferred embodiment of the present invention, the need for subtractor circuitry is replaced by setting the read counter to a value different from the value of the write counter. The offset value is equal to the value of the desired FIFO flag. FIG. 2 shows how offset logic is used during a chip reset to set the read counter to its reset value. Also, the fact that a subtractor is not used in the FIFO flag logic circuitry means that provisions must be made to safeguard the integrity of the FIFO flag. For purposes of simplicity, consider a FIFO with 8 data locations which generates a half full flag. For the half full flag, the flag value will be equal to 4 which is half of 8. During a chip reset, the write counter reset value is equal to 0 (0000) while the read counter reset is offset from the write counter reset by the value of the flag. Therefore, the read counter reset is equal to 4 (0100). The difference between the write counter reset and the read counter reset is 4, the value of the FIFO flag. FIG. 2 shows that, during a chip reset, offset logic 46 ensures that the read counter 40 is reset to a value offset from the write counter 44 by the value of the FIFO flag.

As shown in FIG. 3 and described above, when the write bit is greater than the corresponding read bit, compare output 32 is equal to a logic high. However, when the write bit is less than the corresponding read bit, compare output 32 is equal to a logic low. When the write bit is equal to the corresponding read bit, compare input 30 is passed through as compare output 32. Upon reset, the read counter and write counter are equal to 0100 and 0000, respectively. After performing 3 writes, the read counter is still 0100, but the write counter is now 0011. And, because the write counter is less than the read counter, compare output signal 59 of comparator group 50 is equal to 0. In this 4 bit example, only compare output signal 59 of comparator group 50 is used. However, in a more realistic 16 bit example, 4 compare output signals 59, 69, 79, and 89 from comparator groups 50, 60, 70, and 80, respectively, are used. Next, 1 more write is performed meaning that the FIFO is now half full. After the fourth write, the read counter is still 0100, but the write counter is now equal to 0100. At this point, since the read and write counters are equal, compare output signal 59 is still equal to 0 which accurately reflects a half full flag. One more write means that the write counter, now equal to 0101, is greater than the read counter. Therefore, compare output signal 59 changes in value and is now equal to 1. This value of 1 accurately reflects greater than a half-full condition, namely, equal to or greater than half full +1.

The above example worked fine, because no wrap-around condition occurred. The following example builds on the above example and illustrates the wrap-around problem for a half-full flag. Starting at the reset condition, the read and write counter are 0100 and 0000, respectively. Upon 3 writes, the flag is equal to half-full −1 and the write counter increments to 0011. Compare output signal 59 is equal to 0 since the write counter is less than the read counter. Next, 10 reads and 10 writes are performed, causing the read and write counters to increment to 1110 and 1101, respectively. Because the same numbers of reads as writes was performed, the flag is still equal to half full −1, and compare output signal 59, which is still equal to 0, accurately reflects the flag status. An additional write brings the total number of writes to 14 and the number of reads to 10. At this point, the flag is half-full as signified by the difference of 4 between the read and write counts. Read counter remains 1110 and the write counter increments one to 1110. Compare output signal 59 is equal to 0, correctly representing the half-full flag status. After still another write, the read and write counters are 1110 and 1111, respectively. This is the first time the write counter is greater than the read counter, and so the compare output signal 59 is equal to 1, indicating the new flag status is half full +1. The wrap-around condition occurs in the next step. Performing 1 more write, makes the write count "wrap-around" and reset itself to 0000; the read counter is still equal to 1110. According to the logic rule used, since the write counter is less than the read counter, compare output signal 59 is equal to 0. However, the zero value of compare output signal 59 does not accurately reflect the flag status which is half full +2. The wraparound of the write counter has caused an error condition.

To handle the wrap-around condition described above, the most significant bits (MSBs) of the read and write counter are reset to 0 when both are equal to 1. FIG. 2 shows the use of the Rollover MSB Reset signal to reset the MSBs of both the read and write counter. To illustrate the effectiveness of this method, consider the following example. After resetting the read and write counters and then performing 8 writes, the read and write counters are equal to 0100 and 1000, respectively. The FIFO is full, and compare output signal 59 is equal to 1, which indicates an equal to or greater than half full +1 condition. Next 4 writes and 4 reads are performed, resulting in the read and write counters being incremented to 1000 and 1100, respectively. Compare output signal 59 is equal to 1 since the FIFO is still full. After the 4 reads and writes, the MSB of both the read and write counter are equal to 1. At this point, both MSBs are reset to 0, resulting in a read count of 0000 and a write count of 0100. Compare output signal 59 is still equal to 1, consistent with the FIFO still being full. Resetting of the MSBs to 0 could occur anytime before the write count wrapped around. In this case, resetting could be done during any of the subsequent 3 write cycles.

Consider now the wrap-around condition for a full flag example. In the full flag case, the read counter and write counter are set to 0111 and 0000, respectively. The difference between the counters is equal to 7 for the full flag case. Starting at a reset state and performing 7 writes yield a read count and write count of 0111 and 0111, respectively. Since the counts are equal, compare output signal 59 is equal to 0. When 1 more write is performed, the FIFO is full, the write count increments to 1000, and the write count is greater than the read count resulting in compare output signal 59 being equal to 1. Performing 1 read cycle means that the FIFO is full −1, and both the write count and read count are equal to 1000. The MSBs are reset to 0, and the resultant read and write counts are 0000 and 0000, respectively. Compare output signal 59 is equal to 0, accurately reflecting the fact that the FIFO is full −1. Resetting the read and write count MSBs to 0 when both the read and write counts are equal to 1000 could have been done anytime during the subsequent 7 write cycles, since wrap-around would not have happened until the eighth write cycle.

Finally, consider the empty flag example where the read and write reset values are both equal to 0000. At reset, compare output signal 59 is 0 since the read and write counts are equal. After the first write, compare output signal 59 is 1 since the FIFO is no longer empty. Likewise, during the next 7 writes, compare output signal is equal to 1. After the 7th write, the read and write count are 0000 and 1000, respectively. Performing 7 reads increments the read count to 0111. The read count is still less than the write count and so compare output signal 59 is still equal to 1, accurately reflecting that the FIFO is not empty. 7 subsequent writes and 1 subsequent read increments the read and write count to 1000 and 1111, respectively. Since, at this point, the MSBs are both equal to 1, they must be reset to 0 before the write count wraps around the next write cycle. This is an example where the MSBs must be reset to 0 before the very next write. If this small amount of time is insufficient for a specific application, another bit may be added to the counter to allow for more time to reset the MSBs of the counters. In the empty flag example just described, a 5 bit counter instead of the 4 bit counter could be used with the 5th bit resettable when both MSBs are equal to 1. This would provide 8 additional cycles to perform the MSB reset function.

Figure 5:
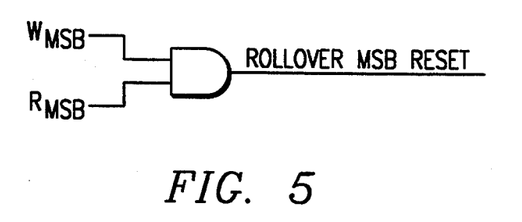
FIG. 5 is a schematic diagram showing logic for determining the Rollover MSB Reset signal.
Figure 6:
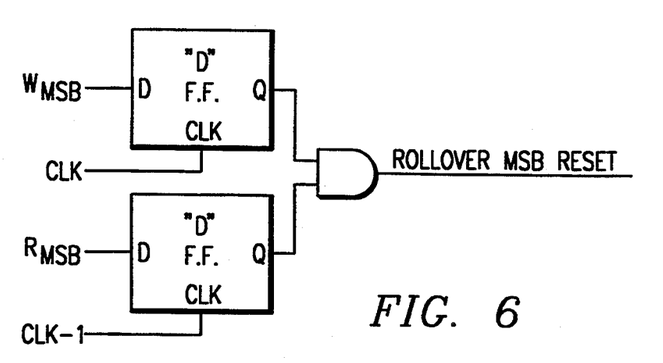
FIG. 6 is a schematic diagram showing an alternate embodiment for determining the Rollover MSB Reset signal.

Resetting the read and write count MSBs is accomplished by the generation of a Rollover MSB Reset signal as shown in FIGS. 5 and 6. FIG. 5 is a schematic diagram showing logic for determining the Rollover MSB Reset signal. The MSBs of both the read and write counts are input to an AND logic gate. When both MSBs are equal to a 1, then the Rollover MSB Reset signal is also equal to a logic 1.

FIG. 6 is a schematic diagram showing an alternate embodiment for determining the Rollover MSB Reset signal. In this embodiment, the Rollover MSB Reset signal is synchronized to a clock signal(s). In FIG. 6, clock signals CLK and CLK-1 may or may not be the same clock. The MSBs of the read and write count, WMSB and RMSB are input to their respective D Flip Flop. Upon receipt of the clock signal input, the MSB is latched out of the D Flip Flop as output Q. The Q outputs from both D Flip Flops are gated into logic which produces a valid Rollover MSB Reset signal when both WMSB and RMSB are equal to a 1. The D Flip Flop could easily be replaced by a D latch which would generate the same Rollover MSB Reset signal. When a valid, logic high, Rollover MSB Reset signal is produced as shown in FIG. 5 or FIG. 6, then the MSB of the read count and the write count is reset to 0.

The parallelized difference flag logic described above has important advantages over the prior art FIFO flag generation circuitry. A read counter which is offset from the write counter by a value equal to the desired flag allows the FIFO flag to be generated without the use of a subtractor. The use of the Rollover MSB Reset signal prevents a wrap-around condition giving erroneous flag status. In addition to not using a subtractor, the invention uses a parallelized comparator which in itself speeds up the comparison process in proportion to the number of parallel comparator groups used. In the case where full, half-full, and empty FIFO flags are required, three distinct parallelized difference flag circuits as described above can be used. The three flag circuits may be laid out independently and physically separate from each other. In the prior art, it was necessary to lay out all flag circuitry in one large block, requiring chip area which is often hard to come by. It is much easier to fit three distinct flag circuits in available spaces in the overall FIFO layout. In addition to circuit space savings, the parallelized difference flag logic which does not use subtractors is less complex than prior art serial difference flag logic in that fewer components are needed.

In the invention, a magnitude comparator is used. A magnitude comparator employs true magnitude comparison, by detecting less than, equal to, or greater than conditions. A plain comparator such as that used in prior art flag logic, on the other hand, detects only an equal condition between two values. The use of the magnitude comparator eliminates flag arbitration problems as the read and write counts are skewed against each other across flag boundaries.

The parallelized magnitude comparator has been described in relation to a FIFO flag generation circuit. The magnitude comparator can also be used in a multitude of other applications such as in arithmetic logic units (ALUs) of computers where it is necessary to determine the magnitude of one number relative to that of a second number.

While the invention has been particularly shown and described with reference to two preferred embodiments, it will be understood by those skilled in the art that various changes in form and detail may be made therein without departing from the spirit and scope of the invention.

What is claimed is:

1. Difference flag circuitry, comprising:
   a plurality of bit comparators divided into comparator groups that generate an output signal, wherein each of said bit comparators compares the magnitude between a bit of a first binary value and a bit of a second binary value;
   a control element, having inputs connected to the outputs of said comparator groups, which selects one of the outputs of said comparator groups to be output from said control element;
   means for generating a flag, by setting said first binary value to a value which is offset from said second binary value by the value of said flag; and
   means for preventing said difference flag circuitry from indicating the incorrect number of data bits written into but not yet read from a memory.

2. The difference flag circuitry of claim 1, wherein each said comparator group is independent from every other comparator group.

3. The comparator group of claim 2, wherein said comparator groups compare a plurality of bits simultaneously.

4. The comparator group of claim 2, wherein said comparator groups and said control element perform their respective functions simultaneously.

5. The difference flag circuitry of claim 1, wherein each of said bit comparators generates a compare output which is input to the subsequent bit comparator.

6. The difference flag circuitry of claim 5, wherein the initial bit comparator of said comparator group has as its compare input a signal set to a predetermined level.

7. The difference flag circuitry of claim 5, wherein each said bit comparator has a first value input, a second value input, and a third value input.

8. The difference flag circuitry of claim 7, wherein said first value input is a one bit value determined by performing logic on the bit of said first binary value and the bit of said second binary value to be compared.

9. The difference flag circuitry of claim 8, wherein said second value input is equal to the value of the bit of said first binary value to be compared.

10. The difference flag circuitry of claim 8, wherein the bit of said first binary value and the bit of said second binary value to be compared are a FIFO read count and a FIFO write count, respectively.

11. The difference flag circuitry of claim 7, wherein said third value input is the compare output signal generated by a previous bit comparator.

12. The difference flag circuitry of claim 1, wherein said control element determines which said comparator group contains the highest order corresponding bits which do not match.

13. The control element of claim 12, wherein said control element has a plurality of gates each of which corresponds to one of said comparator groups.

14. The control element of claim 13, wherein said control element has a plurality of transmission gates each of which corresponds to one of said comparator groups.

15. The control element of claim 13, wherein said control element has a plurality of tri-stateable gates each of which corresponds to one of said comparator groups.

16. The comparator of claim 13, wherein said gate receives a first and a second value input which determines whether said gate will allow the first value input to be output from said gate.

17. The gate of claim 16, wherein the first value input is the output from the corresponding said comparator group.

18. The gate of claim 17, wherein the second value input is determined by whether the bits compared in the current said comparator group or higher order said comparator groups match.

19. The gate of claim 16, wherein said gate is capable of not allowing said first value input of said gate to be output from said gate.

20. The gate of claim 16, wherein only one of the plurality of gates may allow said first value input of said gate to be output from said gate.

21. The control element of claim 13, wherein there are four said comparator groups each of which has four bit comparators.

22. The control element of claim 21, wherein each of four said comparator groups corresponds to one said gate for a sixteen bit FIFO flag generation circuit.

23. The difference flag circuitry of claim 1, wherein said prevention means is provided by a reset input which is determined by performing logic on selected bits of said first binary value and said second binary value.

24. The prevention means of claim 23, wherein said selected bits are the most significant bits (MSBs) of said first binary value and said second binary value.

25. The difference flag circuitry of claim 1, wherein erroneous flag status is prevented by resetting selected bits of said first binary value and said second binary value to a predetermined state when said selected bits are both equal to a predetermined logic level based upon a reset input, thereby avoiding a wrap-around condition.

26. The difference flag circuitry of claim 25, wherein said selected bits are the most significant bits (MSBs) of said first binary value and said second binary value.

27. A method for generating difference flag circuitry, comprising the steps of:
   comparing the magnitude between a first value input and a second value input by grouping bit comparators into comparator groups which generate compare outputs which are input to a control element;
   generating a final compare output signal from said control element indicative of whether the magnitude of said first value input is equal to, less than, or greater than the magnitude of said second value input;
   generating a flag, by setting said first value input to a value which is offset from said second value input by the value of said flag; and preventing said difference flag circuitry from indicating the incorrect number of data bits written into but not yet read from a memory.

28. The method of claim 27, wherein said comparator groups, which operate in parallel and independently of each other, generate compare outputs which are input to said control element.

29. The method of claim 27, wherein said control element selects only one of said compare outputs to be output from said control element as a final compare output signal.

30. The method of claim 27, wherein said comparator groups and said control element operate independently and in parallel with each other.

31. The method of claim 27, wherein comparison of the magnitude between said first value input and said second value input is used to generate a flag signal suitable for a FIFO.

32. The method of claim 27, wherein said reset input is determined by performing logic on selected bits of said first value input and said second value input.

33. The method of claim 32, wherein said selected bits are the most significant bits (MSBs) of said first value input and said second value input.

34. The method of claim 27, wherein erroneous flag status is prevented by resetting selected bits of said first value input and said second value input to a predetermined state when said selected bits are both equal to a predetermined logic level based upon a reset input, thereby avoiding a wrap-around condition.

35. The method of claim 34, wherein said selected bits are the most significant bits (MSBs) of said first value input and said second value input.

* * * * *